J. V. JENKINS.
Sheep Shears.
No. 2,613. Reissued May 14, 1867.
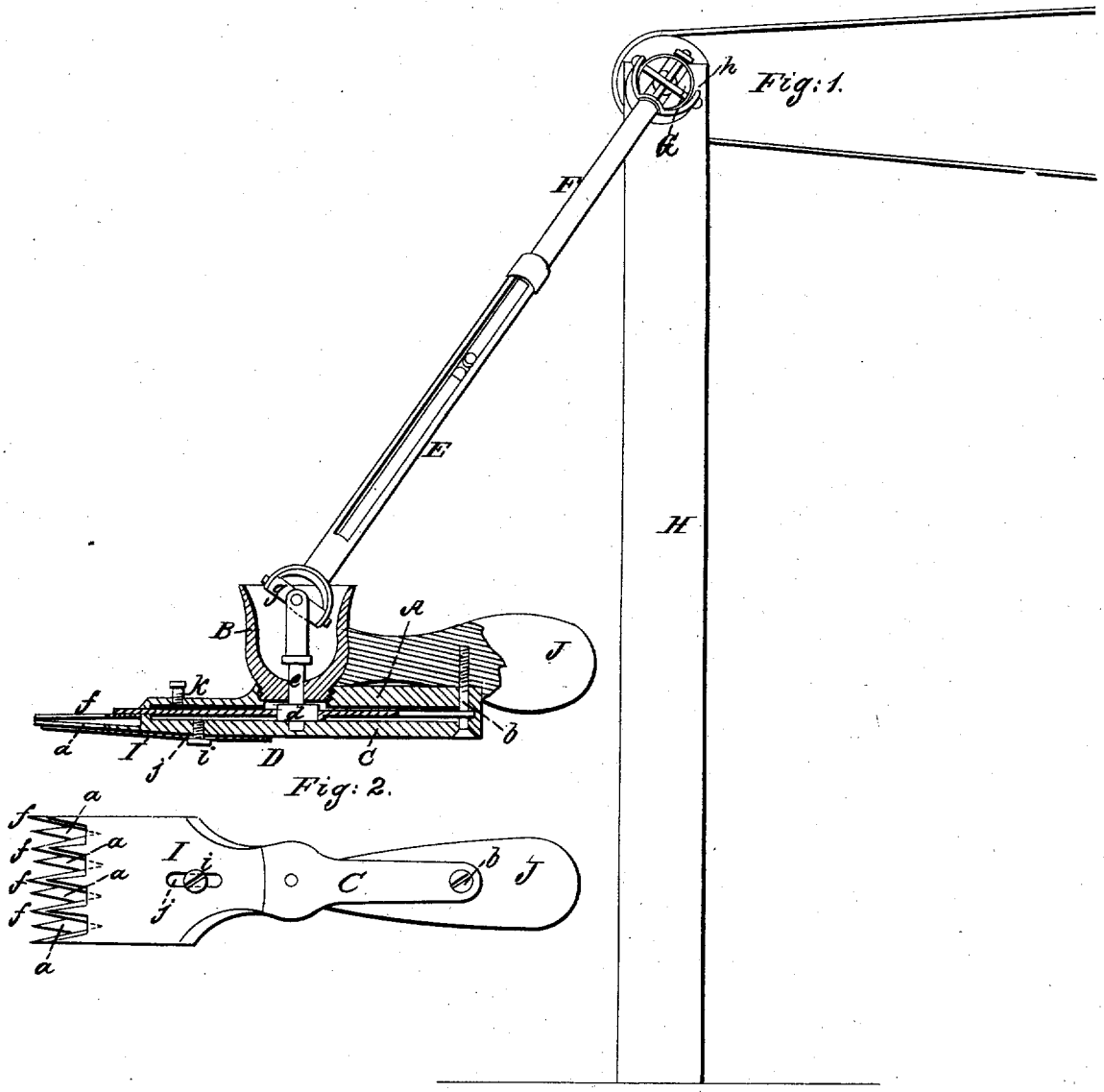
N. PETERS, Photo-Lithographer, Washington, D. C.

United States Patent Office.

RICHARD B. WALKER AND LEWIS MILLER, OF AKRON, OHIO, ASSIGNEES OF JOHN V. JENKINS.

*Letters Patent No.* 15,948, *dated October* 21, 1856; *reissue No.* 2,613, *dated May* 14, 1867.

MACHINE FOR SHEARING SHEEP.

The Schedule referred to in these Letters Patent and making part of the same.

TO ALL WHOM IT MAY CONCERN:

Be it know that I, JOHN V. JENKINS, formerly of Jackson, in the county of Jackson, and State of Michigan, now residing in Manchester, county of Washtenaw, and State aforesaid, have invented certain new and useful improvements in Machines for Shearing Sheep; and I do hereby declare the following to be a full, clear, and exact description of the same, reference being had to the accompanying drawings, making a part of this specification, in which—

Figure 1 represents in elevation the frame for carrying and supporting the driving apparatus, and flexible connection between it and the shears, and the shears and portions connected with them in section.

Figure 2 represents a plan of the under side of the shears, or of that side which moves along close to the body of the animal when shearing it.

Similar letters of reference, where they occur in the separate figures, denote like parts of the machine in both of the drawings.

My invention relates to a machine for shearing sheep, as distinguished from an instrument for such purpose, said machine being driven by power of any kind, and the shears requiring only to be guided by the operator, whilst they are worked by the power supplied from a source different from that furnished or supplied by the person using the shears, such organized machine being capable of accomplishing much more work than a hand machine or instrument, and with more ease to the user, and far less danger of injury to the animal sheared by it; and My invention consists, first, in a flexible connection between the stationary power, or first-moving power, and the shears, whereby the shears may, whilst working, be moved over and around the body of the animal by the operator.

My invention further consists in so constructing the shears of a power-shearing machine as that they can be held and guided by one hand, leaving the other hand of the operator free.

My invention further consists in encasing the mechanism that drives the shears so that the wool cannot become entangled therein or clog it.

My invention further consists in driving, direct from an eccentric, a vibrating arm, to which the moving shear or cutter is attached.

My invention further consists in a plate or projection under the stationary fingers to regulate the height of cut, as well as the length of cut at each vibration.

My invention further consists in a presser, to regulate the pressure of the vibrating knife or shear on the stationary fingers.

My invention further consists in placing the power, or first-moving power, by which the knives are vibrated, remote from the shears, leaving the hands free, one to hold the sheep that is to be sheared, the other to guide and direct the shears.

My invention further consists in so attaching the fingers to the bed-plate as that they can be readily detached for being sharpened.

My invention further consists in the arrangement of a slotted vibrating beam or sway-bar so that a wrist may give motion to the same without moving it longitudinally.

My invention further consists in guiding and directing the cutters or shears by the hand of the operator, when said cutters are driven by power independent of said operator.

To enable others skilled in the art to make and use my invention, I will proceed to describe the same with reference to the drawings.

A represents a metallic plate, to the upper part of which, and at about its centre, is attached a socket, B, said socket being in the form of an inverted bell, and shown clearly in fig. 1. This socket or inverted bell serves as a shield to prevent the wool from being caught and wound up by the shaft or universal joint working in or through it. C represents another metallic plate, which is secured to the under side of the plate A; and to the forward end of this under plate C is fastened, so as to be adjustable and removable therefrom, a guard-plate, I, to regulate the height of cut from the skin or body of the animal, as well as to protect the skin from being cut by the shears. The plate C, at its forward end, has a series of saw-shaped teeth or fingers, *a a*, the form of which fingers is distinctly seen in fig. 2, and project beyond the front edge of the top plate A. So, too, the guard-plate I, or gauge-plate, terminates in a series of fingers or serrations underlying those *a a*. A vibrating bar or plate, D, is placed and works between the two plates A C. The rear end of this plate or sway-bar D is hinged or pivoted on a screw, *b*, which screw further serves the purpose of holding together the rear ends of the plates A C. The central portion of the plate, beam, or sway-bar D has an oblong slot, *c*, made through it, in which slot an eccentric or wrist, *d*, works, which vibrates the said bar laterally without moving it longitudinally. The eccentric or wrist *d* is upon the shaft *e*, which shaft passes up through the plate A and into the cup or bell-shaped socket B. To the forward end of the sway-bar D is attached a series of triangular or saw-shaped teeth, *f*, which work or are vibrated over those *a a* underneath, the two sets forming shearing knives or cutters, and a set-screw, *k*, passing through the upper plate A, bears upon the plate or bar D; and, by turning this screw, the proximity of the fingers or teeth *f* to the shear blades *a a* may be accurately adjusted, said screw forcing the plate D and its fingers upon the under plate C and its fingers *f*. The upper end of the shaft *e* is connected by a universal joint, *g*, to a sleeve or tubular shaft, E, which is fitted loosely on a rod or shaft, F, and by means of a slot and pin the sleeve or tubular shaft may be slid out and in upon the other rod or shaft F, whilst both would turn together, as they transmit the power through them that drives the shears. The upper end of the rod F is attached, by a universal joint, *h*, to a driving-shaft, G, supported in a proper frame or support, H, and rotated by a belt or band coming from any first-moving power. The guard-plate I is attached to the under plate C by a set-screw, *i*, passing through a slot, *j*, in the guard-plate, and by this means the guard-plate may be set forward or back, to regulate the height, and also the length, of cut at each vibration of the shear, and to prevent the skin from crowding in between the fingers and being cut. A set-screw, *k*, passes through the upper plate A, and bears upon or against the sway-bar or plate D, and by turning this screw the teeth *f* or cutters on said bar or plate D may be made to bear more or less upon the fingers *a a*, against or in concert with which they shear or cut the fleece from the body of the animal. The eccentric or wrist *d*, as well as the slot in the sway-bar D, in which it works, are completely encased between the plates A C, so that the wool or fleece cannot be caught in between them, which casualty not only clogs the working parts of the machine, but often causes injury to the animal by pulling the cutters down upon the skin, and otherwise forcing the shears beyond the easy control of the operator. The shaft *e* and the universal joint *g*, for similar reasons, are shielded or protected from the wool or fleece by the cup B. Where the sway-bar D passes out in front and between the plates A C, the space is closed, as far as practicable to do so, for the purpose of preventing the wool or fleece from being caught therein. Thus, at all the points or parts where there are moving devices the precaution is taken to prevent the wool or fleece from catching or winding in, such consequences being almost fatal to the use of power machines for shearing sheep, and I have consequently provided against if not entirely avoided the difficulty. J is handle by which the operator guides and directs, by one hand, the machine over and around the body of the animal, whilst with the other hand he can hold the animal, not being required to furnish the power that vibrates the cutting shear. The flexible connection between the shears and the driving power allows the shears to be moved around in various directions, and also to be moved from or towards the point where the power is connected to this flexible connection. The advantage of furnishing the power necessary to drive the machine from a source independent of the operator of the machine will be obvious, as the operator then has only to guide and direct the shears, which he can do with one hand, and without great exertion, whilst with the other he can hold or turn the animal, or clear the cut fleece, or arrange it for the more perfect and easy after operation of the shears.

Having thus fully described my invention, what I claim therein as new, and desire to secure by Letters Patent, is—

A flexible and extensible connection between the stationary or first-moving power and the shears, whereby the shears may, whilst cutting, be moved over and around the body of the animal, substantially as described.

I also claim so constructing the shears of a power-shearing machine as that it can be held and guided by one hand, leaving the other hand of the operator free, substantially as described.

I also claim encasing the mechanism that drives the shears so that the wool or fleece cannot become entangled therein, substantially as and for the purpose set forth.

I also claim driving the vibrating arm, to which the moving shear or cutter is attached, directly from an eccentric, substantially in the manner described.

I also claim a guard-plate or projection under the stationary fingers, to regulate the height as well as the length of cut at each vibration of the shear, substantially as described.

I also claim a presser to regulate the pressure of the vibrating knife or shear upon the stationary fingers, substantially as described.

I also claim the placing or locating of the power by which the shears are vibrated remote from the shears, thus leaving the hands of the operator free, one to hold the animal, the other to guide and direct the shears, substantially as described.

I also claim so attaching the fingers to the bed-plate as that they can be readily detached for being sharpened, substantially as described.

I also claim the arrangement of a slotted vibrating plate or sway-bar, so that a wrist may give motion to it laterally, without moving it longitudinally, substantially as described.

I also claim guiding and directing the cutters or shears by the hand of the operator, when said cutters are driven by power independent of said operator, substantially as described.

JOHN V. JENKINS.

Witnesses:
JOHN V. RICE,
MARY B. RICE.